United States Patent
Kume et al.

(10) Patent No.: US 9,180,060 B2
(45) Date of Patent: Nov. 10, 2015

(54) ELECTRIC VEHICLE AND METHOD FOR CONTROLLING ELECTRIC VEHICLE

(71) Applicant: Panasonic Corporation, Osaka (JP)

(72) Inventors: Yohei Kume, Osaka (JP); Tomohiro Shimoda, Tokyo (JP); Akihiro Ohta, Osaka (JP); Shohei Tsukada, Hyogo (JP); Hideo Kawakami, Osaka (JP); Tohru Nakamura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 13 days.

(21) Appl. No.: 14/002,423

(22) PCT Filed: Nov. 7, 2012

(86) PCT No.: PCT/JP2012/007142
§ 371 (c)(1),
(2) Date: Aug. 30, 2013

(87) PCT Pub. No.: WO2013/080447
PCT Pub. Date: Jun. 6, 2013

(65) Prior Publication Data
US 2014/0067182 A1    Mar. 6, 2014

(30) Foreign Application Priority Data
Dec. 1, 2011   (JP) .................... 2011-263297

(51) Int. Cl.
*A61G 5/04* (2013.01)
*B60B 19/00* (2006.01)
(Continued)

(52) U.S. Cl.
CPC .............. *A61G 5/04* (2013.01); *B60B 19/003* (2013.01); *B60L 11/1805* (2013.01);
(Continued)

(58) Field of Classification Search
CPC ..... A61G 5/04; B60B 19/003; B60L 11/1805; B60L 11/1877; B60L 15/2036
USPC ............................................ 701/22; 180/65.1
See application file for complete search history.

(56) References Cited

U.S. PATENT DOCUMENTS

2005/0087375 A1*   4/2005   Steele et al. ................. 180/65.1
2005/0154504 A1*   7/2005   Fenelli ............................. 701/1
(Continued)

FOREIGN PATENT DOCUMENTS

| JP | 2000-005239 | 1/2000 |
| JP | 2000-042046 | 2/2000 |

(Continued)

OTHER PUBLICATIONS

International Search Report issued Feb. 12, 2013 in International (PCT) Application No. PCT/JP2012/007142.

*Primary Examiner* — Fadey Jabr
*Assistant Examiner* — Aaron L Troost
(74) *Attorney, Agent, or Firm* — Wenderoth, Lind & Ponack, L.L.P.

(57) ABSTRACT

An omni-directional electric vehicle includes: a body having a chair portion; an operation detection unit which detects an operation direction and an operation amount of an operation input; a travel control information generation unit which generates, based on the operation direction and the operation amount, travel control information including (i) a target straight-movement speed for moving the body in a forward/backward direction and (ii) a target rotation speed for rotating the body about a rotation center; and a control unit which drives a movement mechanism of the body according to the travel control information. The travel control information generation unit-changes, based on the target straight-movement speed, the rotation center for the target rotation speed from a reference position which is set virtually and fixedly to the body in the forward/backward direction.

7 Claims, 19 Drawing Sheets

(51) Int. Cl.
*B60L 11/18* (2006.01)
*B60L 15/20* (2006.01)
*A61G 5/10* (2006.01)

(52) U.S. Cl.
CPC ........ *B60L 11/1877* (2013.01); *B60L 15/2036* (2013.01); *A61G 2005/1051* (2013.01); *A61G 2203/14* (2013.01); *B60B 2200/20* (2013.01); *B60L 2200/34* (2013.01); *B60L 2220/44* (2013.01); *B60L 2240/421* (2013.01); *B60L 2250/24* (2013.01); *B60L 2260/28* (2013.01); *Y02T 10/642* (2013.01); *Y02T 10/7005* (2013.01); *Y02T 10/705* (2013.01); *Y02T 10/7275* (2013.01)

(56) References Cited

U.S. PATENT DOCUMENTS

| | | | |
|---|---|---|---|
| 2005/0236217 A1* | 10/2005 | Koelin et al. | 180/411 |
| 2006/0048976 A1* | 3/2006 | Deguchi et al. | 180/6.5 |
| 2012/0265384 A1* | 10/2012 | Trowell | 701/22 |

FOREIGN PATENT DOCUMENTS

| | | |
|---|---|---|
| JP | 2000-126242 | 5/2000 |
| JP | 2001-104396 | 4/2001 |

* cited by examiner ately. When the joystick 3 is twisted to the left, the electric wheelchair 1 rotates to the left at the current position to change the orientation. When the joystick 3 is twisted to the right and inclined to diagonally forward right, the electric wheelchair 1 moves to diagonally forward right translationally and rotates to the right to change the orientation.

ELECTRIC VEHICLE AND METHOD FOR CONTROLLING ELECTRIC VEHICLE

TECHNICAL FIELD

The present invention relates to an omni-directional electric vehicle which travels in all directions based on an operation by an operator, and a method for controlling the electric vehicle.

BACKGROUND OF INVENTION

Background Art

As a wheelchair for use in hospitals or nursing and personal care facilities, an electric wheelchair has been proposed which has a movement mechanism for traveling in all directions using omni wheels and the like. Since this electric wheelchair can move in all directions without changing the orientation of the body (that is, forward, backward, left, or right movement is possible while the user of the wheelchair remains facing forward), the electric wheelchair is useful when the user stops alongside a bed and moves around a small space in a hospital room.

FIG. 20 is a perspective view of a conventional electric wheelchair which can move in all directions.

As shown in FIG. 20, an electric wheelchair 1 which can move in all directions has, under the body, four of wheel 2 (omni wheel), four actuators (not shown) which rotate the four wheels 2 independently, a joystick 3, and a detection unit (not shown). The joystick 3 serves as an operation detection unit which allows the user to operate the wheelchair in forward, backward, left, or right directions and in a rotational direction. The electric wheelchair 1 calculates a target speed based on an operation made on the joystick 3 and detected by the detection unit. Furthermore, the electric wheelchair 1 calculates a command value for each actuator that drives each wheel 2 based on the calculated target speed, and outputs the command value to a control unit that controls the actuators. The electric wheelchair 1 makes translational movement and rotational movement based on this command value.

For example, when the joystick 3 is inclined forward, the electric wheelchair 1 moves forward translationally. When the joystick 3 is inclined to the left, the electric wheelchair 1 moves to the left translationally without changing the orientation. When the joystick 3 is inclined to diagonally forward right, the electric wheelchair 1 moves to diagonally forward right translationally without changing the orientation. When the joystick 3 is twisted to the left, the electric wheelchair 1 rotates to the left at the current position to change the orientation. When the joystick 3 is twisted to the right and inclined to diagonally forward right, the electric wheelchair 1 moves to diagonally forward right translationally and rotates to the right to change the orientation.

Since the above-described electric wheelchair 1 can move in all directions in response to the operation made on the joystick 3, it is useful for use in facilities having small spaces (for example, see Patent Literature (PTL) 1).

The electric wheelchair disclosed in PTL 1 includes an inputting device for changing the rotation center for rotational movement. The electric wheelchair in PTL 1 moves by driving the wheels using a setting value of the inputting device and a command value of the operation handle. With the electric wheelchair in PTL 1, it is possible to set by the inputting device a position of the user's head or a position preferred by the user as the rotation center for the rotational movement, thereby changing the rotation center without requiring a mechanical change.

CITATION LIST

Patent Literature

[PTL 1] Japanese Unexamined Patent Application Publication Number 2000-042046

SUMMARY OF INVENTION

However, in order not to give a strange feeling to the user of the electric wheelchair when rotating, the conventional electric wheelchair changes a position of the rotation center of the electric wheelchair to a position where the user's head is assumed to be. Therefore, although the conventional electric wheelchair does not give the user a feeling of strangeness when the user rotates the electric wheelchair and changes the direction at the current position since the electric wheelchair rotates about the user's head, it has a problem in that, for example, when the user tries to turn a corner the turning orbit is complicated which makes it difficult for the user to turn. The corner here includes, for example, a corner of a corridor or an intersection.

The present invention has an object to provide an omni-direction electric vehicle and a method for controlling the electric vehicle for solving the above problem.

In order to achieve the above object, an electric vehicle according to the present invention is an omni-directional electric vehicle including: a body having a chair portion on which a user sits; a first detection unit configured to detect an operation direction and an operation amount of an operation input by the user; a first processing unit configured to generate, based on the operation direction and the operation amount, travel control information including (i) a target straight-movement speed for moving the body in a forward/backward direction set to the body and (ii) a target rotation speed for rotating the body about a rotation center; and a control unit configured to drive a movement mechanism of the body according to the travel control information, wherein the first processing unit is configured to change, based on the target straight-movement speed, a position of the rotation center for the target rotation speed from a reference position set to the body in the forward/backward direction.

Furthermore, in order to achieve the above object, a method for controlling an electric vehicle according to the present invention is a method for controlling an omni-directional electric vehicle which includes a body having a chair portion on which a user sits, and a first detection unit which detects an operation direction and an operation amount of an operation input by the user, the method including: generating, based on the operation direction and the operation amount, travel control information including (i) a target straight-movement speed for moving the body in a forward/backward direction set to the body and (ii) a target rotation speed for rotating the body about a rotation center; and when driving a movement mechanism which drives the body according to the travel control information, changing, based on the target straight-movement speed, a position of the rotation center from a reference position set to the body in the forward/backward direction.

It is to be noted that execution of a program for causing a computer to execute each processing included in the method for controlling the electric vehicle is also included in the implementation of the present invention. Execution of a recording medium having the program recorded thereon is also included in the implementation of the present invention.

The present invention provides an omni-directional electric vehicle which can turn a corner easily for example, and a method for controlling the electric vehicle.

DETAILED DESCRIPTION OF INVENTION

Figure 1:
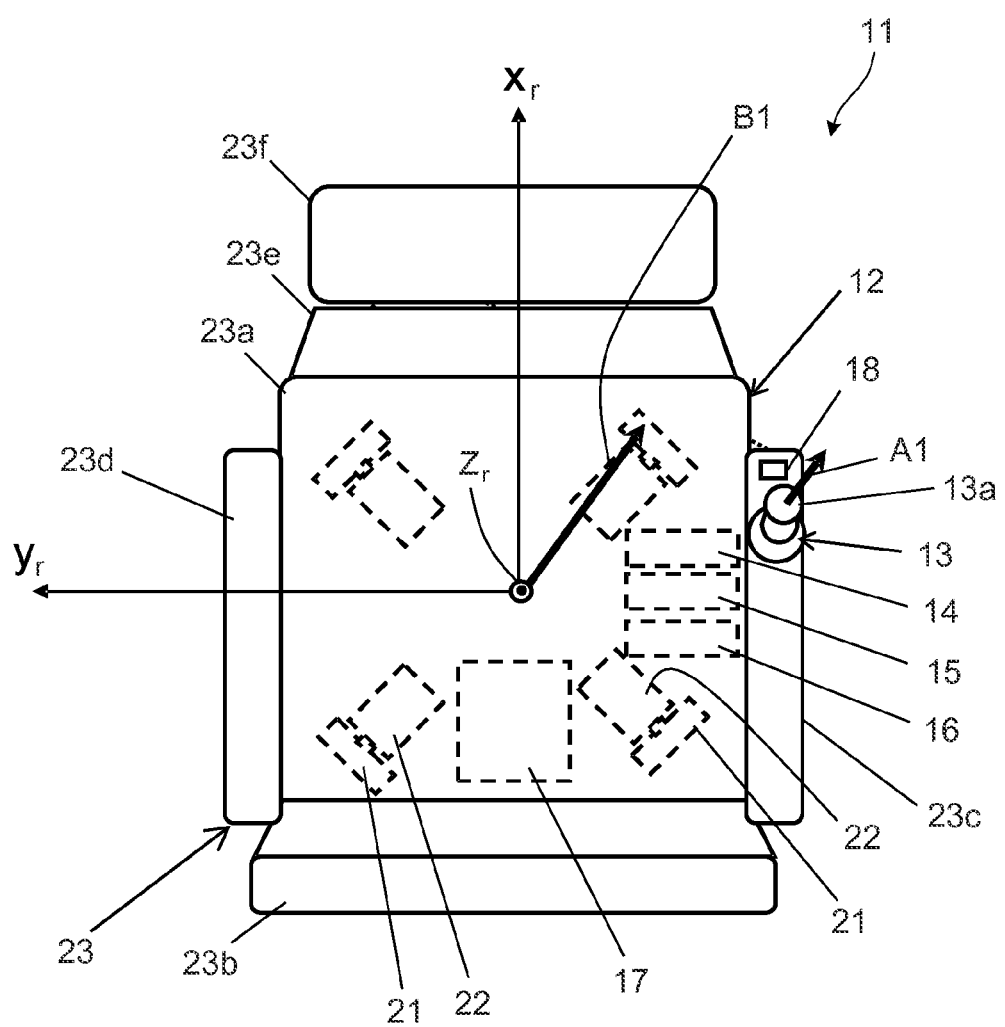
FIG. 1 is a plan view of an electric wheelchair according to Embodiment 1.

The following describes embodiments of the present invention, with reference to the Drawings. It is to be noted that in the description below, the same constituent elements are denoted by the same numerals and description is omitted as appropriate. Furthermore, in the Drawings, illustration is provided schematically with focusing on each constituent element, in order to facilitate understanding. Furthermore, embodiments below are mere examples of the present invention. Accordingly, the present invention is determined by the wording in the Claims with reference to the embodiments below, and therefore should not be limited to the embodiments. Accordingly, out of the constituent elements in the following embodiments, those not stated in the independent claims describing the broadest concept of the present invention are not necessary for achieving the object of the present invention, and are described as optional constituent elements included in a more preferable embodiment.

It is to be noted that both in the Claims and in the Description, forward indicates a direction toward the front of the user sitting on the electric wheelchair when the user faces forward, and backward indicates the direction opposite from forward. Furthermore, the right indicates the right in a direction orthogonal to the forward direction (the right of the user), and the left indicates the left in a direction orthogonal to the forward direction (the left of the user).

Embodiment 1

Figure 2:
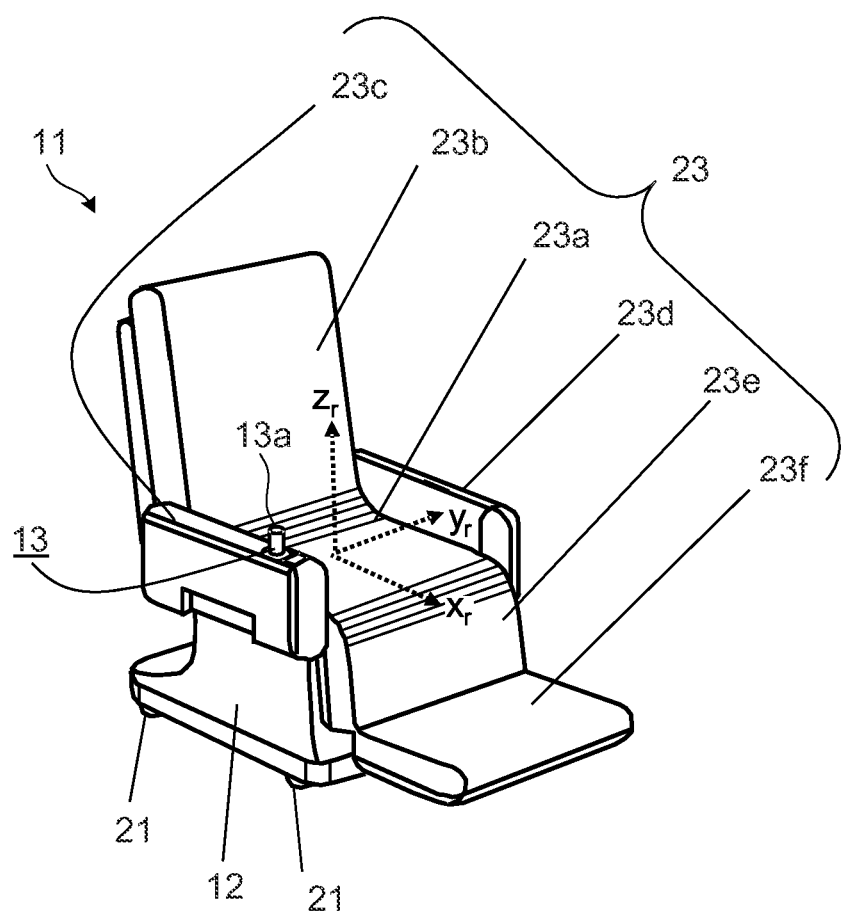
FIG. 2 is a perspective view of the electric wheelchair according to Embodiment 1.

FIG. 1 is a plan view of an omni-directional electric wheelchair according to Embodiment 1. FIG. 2 is a perspective view of the omni-directional electric wheelchair according to Embodiment 1.

In Embodiment 1, description is provided on the omni-directional electric wheelchair, as an example of the omni-directional electric vehicles. It is to be noted that the omni-directional electric vehicle includes omni-directional robots or omni-directional motor vehicles on which users can ride, in addition to wheelchairs.

In FIG. 1 and FIG. 2, in order to facilitate understanding, a vehicle coordinate system $\Sigma r$ which moves together with a body 12 of an electric wheelchair 11 is set virtually and fixedly to the body 12 of the electric wheelchair 11. The vehicle coordinate system $\Sigma r$ is a coordinate system having three axes of an $x_r$-axis, a $y_r$-axis, and a $z_r$-axis orthogonal to each other. Here, a xy plane defined by the $x_r$-axis and the $y_r$-axis is a horizontal plane parallel to the ground. The $x_r$-axis extends in the direction toward the front of the electric wheelchair 11. It is to be noted that the front of the electric wheelchair 11 is a direction in which the user sitting on the electric wheelchair 11 faces straight forward. Furthermore, an origin of the vehicle coordinate system $\Sigma r$ is set on a first bottom 23a of a chair portion 23 described later, which is at a position that corresponds to, on the xy plane, an approximate center of the head of the user sitting on the chair portion 23. Furthermore, the origin is set as a reference position.

It is to be noted that the vehicle coordinate system $\Sigma r$ is set virtually to facilitate description. Therefore, the vehicle coordinate system $\Sigma r$ is not limited to orthogonal coordinate system and arbitrary coordinate system such as polar coordinate system may also be used. Furthermore, the origin may be positioned at an arbitrary position.

As shown in FIG. 1 and FIG. 2, the electric wheelchair 11 includes: a movement mechanism including a plurality of wheels 21 and a plurality of actuators 22; a body 12 in which the movement mechanism is provided; a first detection unit 13; a first processing unit 14; a control unit 15 which controls the actuators 22; and a mode switching unit 16 which switches between operation modes of the first processing unit 14. The first detection unit 13 is an operation detection unit which detects an operation made on the joystick 13a. The first processing unit 14 is a travel control information generation unit which controls travel of the electric wheelchair 11. A basic structure of the body 12 is a vehicle body portion of the electric wheelchair 11. The electric wheelchair 11 further includes a battery unit 17 which supplies electric energy to the actuators 22, the control unit 15, etc., and the chair portion 23.

The body 12 has, on its bottom surface, four actuators 22 installed in a manner that directions of the rotation axes of the actuators intersect in a cross. Each of the actuators 22 is provided with a wheel 21 about the rotation axis, and the wheels 21 and the actuators 22 constitute the movement mechanism. This movement mechanism allows the electric wheelchair 11 to serve as an omni-directional electric wheelchair. The electric wheelchair 11 causes each of the actuators to independently drive (rotate) the corresponding wheel 21, thereby allowing the body 12 to move translationally in all directions. All directions include forward, backward, right, left, and diagonal directions. Example of the wheel 21 includes omni wheels which can move in all directions.

The chair portion 23 on an upper portion of the vehicle body portion is provided for the user to sit on. In the present embodiment, the chair portion 23 is attached to the vehicle body portion in a manner that the forward/backward direction when the user sitting on the chair portion 23 faces forward is the $x_r$ axis, while the right/left direction is the $y_r$ axis. The chair portion 23 includes: a first bottom 23a; a second bottom 23b provided from the back side of the first bottom 23a; armrests 23c and 23d provided in the right and left of the first bottom 23a respectively; a third bottom 23e provided from the front side of the first bottom 23a in a lower direction; and a fourth bottom 23f provided from a lower end of the third bottom 23e to protrude forward. Here, the first bottom 23a is a buttock bottom for the buttock portion, the second bottom 23b is a back bottom for the back portion, the third bottom 23e is a first leg bottom for the leg portion, and the fourth bottom 23f is a second leg bottom which is a footrest portion.

The first detection unit 13 is an interface which detects (i) an operation direction of an operation input by the user of the electric wheelchair 11 and (ii) an operation amount. In the present embodiment, the first detection unit 13 includes the joystick 13a. The joystick 13a is provided on an upper surface of the right armrest 23c. The first detection unit 13 detects the operation amount of an operation input by the user of the electric wheelchair 11, based on an inclination amount of the joystick 13a. Furthermore, the first detection unit 13 detects a direction of an arrow A1 (see FIG. 1) indicating the direction to which the joystick 13a is inclined, as a direction of the operation input by the user of the electric wheelchair 11.

Next, the functional units of the electric wheelchair 11 are described.

Figure 3:
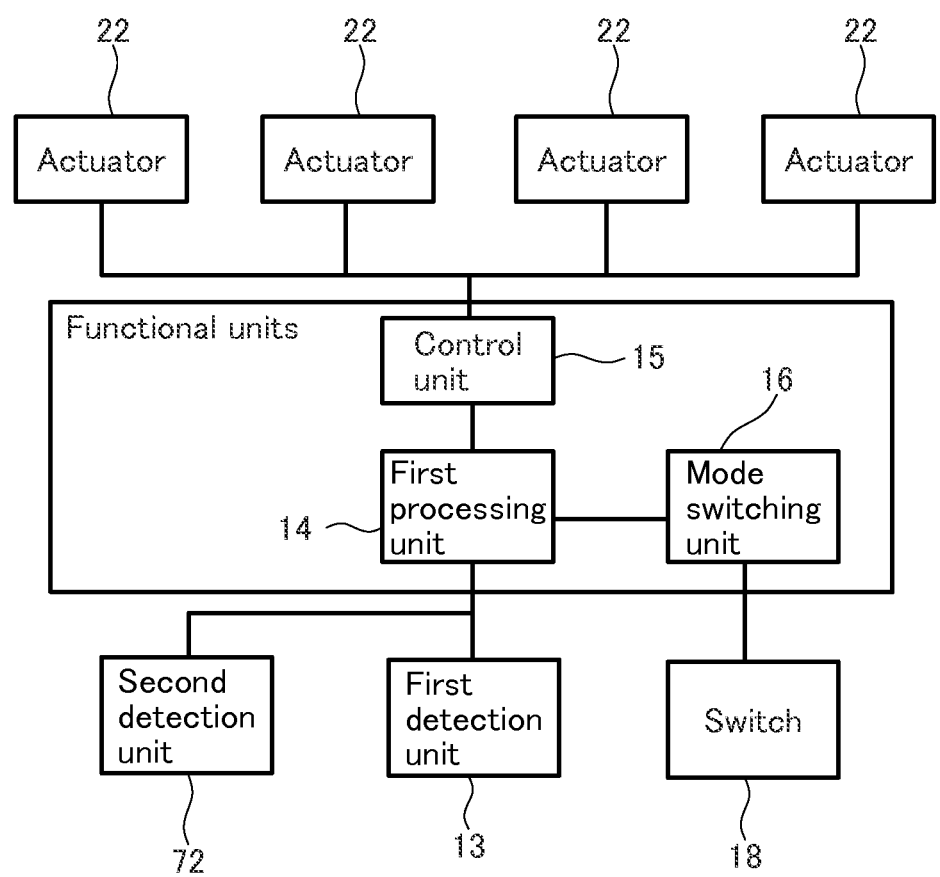
FIG. 3 is a block diagram showing functional units and mechanical units of the electric wheelchair according to Embodiment 1.

FIG. 3 is a block diagram showing the functional units and the mechanical units of the electric wheelchair.

The first processing unit 14 is a processing unit which generates travel control information from the operation direction and the operation amount detected by the first detection unit 13. The first processing unit 14 generates a target translation speed which is included in the travel control information, when a first mode is selected which is described later. This target translation speed has a magnitude and a direction. A direction of the target translation speed, which is indicated by an arrow B1, is the same as the direction indicated by the arrow A1 which is the operation direction (see FIG. 1). Furthermore, the electric wheelchair 11 translates to the direction of the arrow B1. Furthermore, the first processing unit 14 generates a value by multiplying the operation amount detected by the first detection unit 13 by a predetermined conversion coefficient, as the target translation speed. It is to be noted that in Embodiment 1 an apparent impedance coefficient D on the movement of the electric wheelchair 11 is set, and 1/D is used as the conversion coefficient. In other words, the target translation speed is calculated by multiplying the operation amount detected by the first detection unit 13 by 1/D. The magnitude of the target translation speed is proportional to the magnitude of the operation amount, and the direction of the target translation speed matches the operation direction.

The control unit 15 controls the actuators 22 according to the travel control information, drives the wheels 21, and causes the body 12 to move.

The mode switching unit 16 switches between the operation modes of the first processing unit 14 in response to an operation made on a switch 18 which is a button. The button switch 18 is provided on the upper surface of the armrest 23c and in front of the joystick 13a.

The electric wheelchair 11 according to Embodiment 1 switches the movement of the electric wheelchair 11 in response to the operation made on the joystick 13a, by switching between the operation modes of the first processing unit 14 by the mode switching unit 16.

First, description is provided on the switching between the first mode and the second mode included in the operation modes. By switching the operation mode from the first mode to the second mode, the movement to rotate the electric wheelchair 11 by inclining the joystick 13a to the right/left is switched.

Figure 4A:
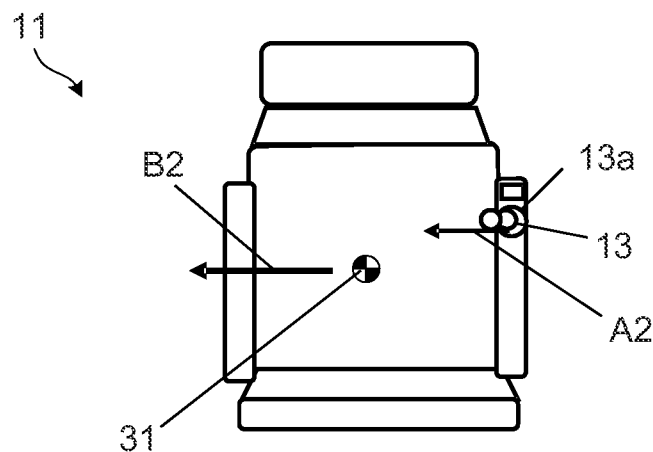
FIG. 4A is a plan view showing movement of the electric wheelchair in a first mode.
Figure 4B:
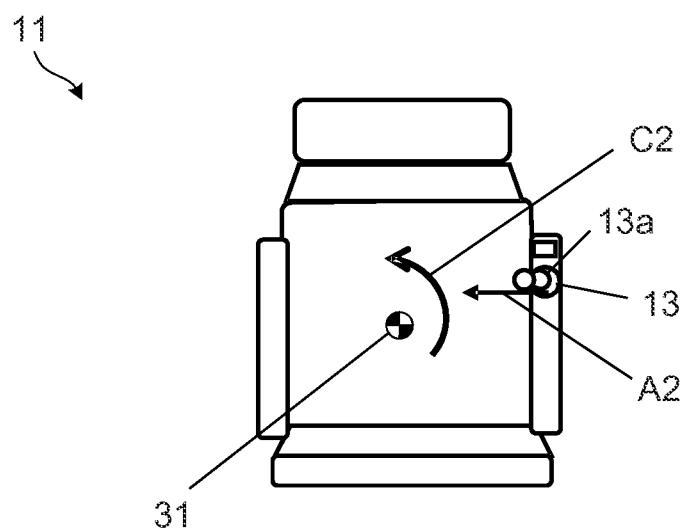
FIG. 4B is a plan view showing movement of the electric wheelchair in a second mode.

FIG. 4A and FIG. 4B are illustrations for describing the two operation modes of the electric wheelchair 11. FIG. 4A is a plan view showing a movement of the electric wheelchair when the first mode is selected, and FIG. 4B is a plan view showing a movement of the electric wheelchair when the second mode is selected.

The first processing unit 14 generates a target translation speed which is the travel control information, based on the operation direction and the operation amount detected by the first detection unit 13. Therefore, when the joystick 13a is inclined to the direction of the arrow A2 which is the same direction as the $y_r$ axis as shown in FIG. 4A, the first processing unit 14 generates the target translation speed which is the travel control information to cause the electric wheelchair 11 to move translationally in the direction of the arrow B2 which is the same direction as the $y_r$ axis.

First, description is provided on the movement of the electric wheelchair 11 when the operation mode is the first mode. When the operation mode of the electric wheelchair 11 is the first mode, the direction of the target translation speed is the same as the operation direction, and the magnitude of the target translation speed is proportional to the operation amount. Therefore, in the first mode, the wheelchair 11 moves translationally in the direction to which the joystick 13a is inclined, through the control unit 15's control of the actuators 22 according to the target translation speed to drive the wheels 21.

Figure 5:
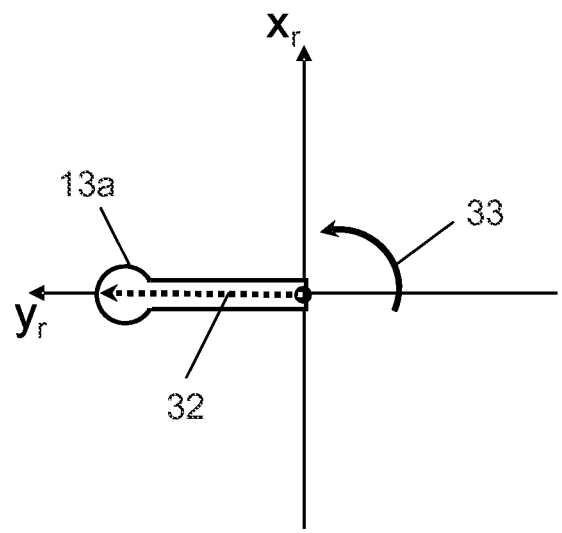
FIG. 5 shows a relationship between a joystick inclined to the left and a target rotation speed.
Figure 6:
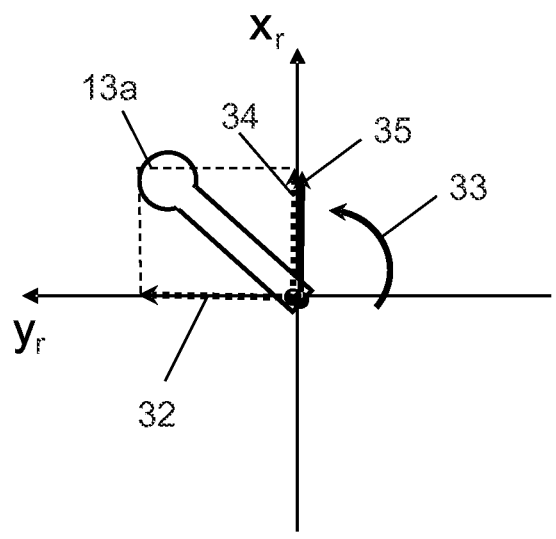
FIG. 6 shows a relationship between the joystick inclined to the left and a target straight-movement speed.

Next, description is provided on the movement of the electric wheelchair 11 when the operation mode is the second mode, with further reference to FIG. 5 and FIG. 6. When the operation mode of the electric wheelchair 11 is the second mode, the first processing unit 14: converts the operation direction and a right/left axial component of the operation amount of the joystick 13, and generates the target rotation speed which is the travel control information; and converts the operation direction and a forward/backward axial component of the operation amount of the joystick 13a, and generates the target straight-movement speed which is the travel control information. For example, in the case shown in FIG. 4B, when the joystick 13a is inclined to the direction of the arrow A2, the operation amount in the operation direction is only the right/left axial component, which causes the electric wheelchair 11 to rotate about the rotation center 31 in the direction of the arrow C2.

FIG. 5 shows a relationship between the joystick inclined to the left and the target rotation speed. FIG. 6 shows a relationship between the joystick inclined to diagonally forward left and the target straight-movement speed and the target rotation speed.

As shown in FIG. 5, when the joystick 13a is inclined to the left (the direction of the $y_r$ axis), the right/left axial component 32 of the operation amount in the operation direction is present in the left. The first processing unit 14 converts the right/left axial component 32 of the operation amount, and generates the target rotation speed 33 for rotating to the left. In other words, in the second mode, the first processing unit 14 converts the right/left axial component 32 of the operation amount to the rotational direction and then to the magnitude of the target rotation speed. After the conversion, the forward/backward axial component present in the direction of the $x_r$ axis is 0, and therefore the target straight-movement speed is not generated. By the first processing unit 14's generation of the target rotation speed 33 as the travel control information, the control unit 15 controls the actuators 22 to cause the body 12 to rotate at the target rotation speed 33. As a result, in the second mode, the user can rotate the electric wheelchair 11 to the left by inclining the joystick 13a to the left without twisting. It is to be noted that the magnitude of the target rotation speed 33 may be generated based on the magnitude of the target straight-movement speed, instead of the right/left axial component of the operation amount (axial component of the $y_r$ axis).

Furthermore, in the second mode, when the joystick 13a is inclined to diagonally left as shown in FIG. 6, the right/left axial component 32 of the operation amount in the operation direction is in the left, and the forward/backward axial component 34 of the operation amount in the operation direction is in the front (direction of the $x_r$ axis). The first processing unit 14 converts the right/left axial component 32 of the operation amount, and generates the target rotation speed 33 for rotating to the left. Furthermore, the first processing unit 14 converts the forward/backward axial component 34 of the operation amount, and generates the target straight-movement speed for translating forward. In other words, as shown in FIG. 6, when the joystick 13a is inclined to diagonally left in the second mode, both the target rotation speed 33 and the target straight-movement speed 35 are generated as the travel control information. By the first processing unit 14's generation of the target rotation speed 33 and the target straight-movement speed 35 as the travel control information, the control unit 15 controls the actuators 22 to cause the body 12 to move at the target straight-movement speed 35 while rotating about the rotation center 31 at the target rotation speed 33. As a result, the user can move the electric wheelchair 11 forward while rotating to the left, by inclining the joystick 13a to diagonally left.

As described above, the electric wheelchair 11 in Embodiment 1 can be rotated by inclining the joystick 13a in the right/left direction with the operation mode being the second mode. In contrast, the electric wheelchair 11 can be translated in the right or left by inclining the joystick 13a in the right/left direction when the operation mode is the first mode. Therefore, by switching the operation mode and inclining the joystick 13a, the electric wheelchair 11 can move translationally in all directions (first mode), and move straight and rotate concurrently (second mode). Furthermore, switching between operation modes will become easy, by using the button switch 18 or a lever switch. For example, when the user turns a corner of a corridor with the electric wheelchair 11, the user can operate the electric wheelchair 11 easily by selecting the second mode. As described above, the electric wheelchair 11 according to Embodiment 1 provides the omni-directional electric wheelchair which allows the user to turn a corner easily.

Furthermore, regarding the conversion coefficient for converting the operation amount to the target translation speed or the target straight-movement speed, it is preferable that the forward axial component of the forward/backward axis of the operation amount is greater than the backward axial component of the forward/backward axis of the operation amount. This is because the view of the user is narrower in the back than in the front, and therefore reducing the target travel speed when moving backward as described above improves the security. It is to be noted that, as described above, the conversion coefficient is the conversion coefficient used by the first processing unit 14 for generating the travel control information.

Next, description is provided on a case where the rotation center 31 of the electric wheelchair 11 is moved. Moving the rotation center 31 of the electric wheelchair 11 allows the user to turn the corner even easier.

Figure 7:
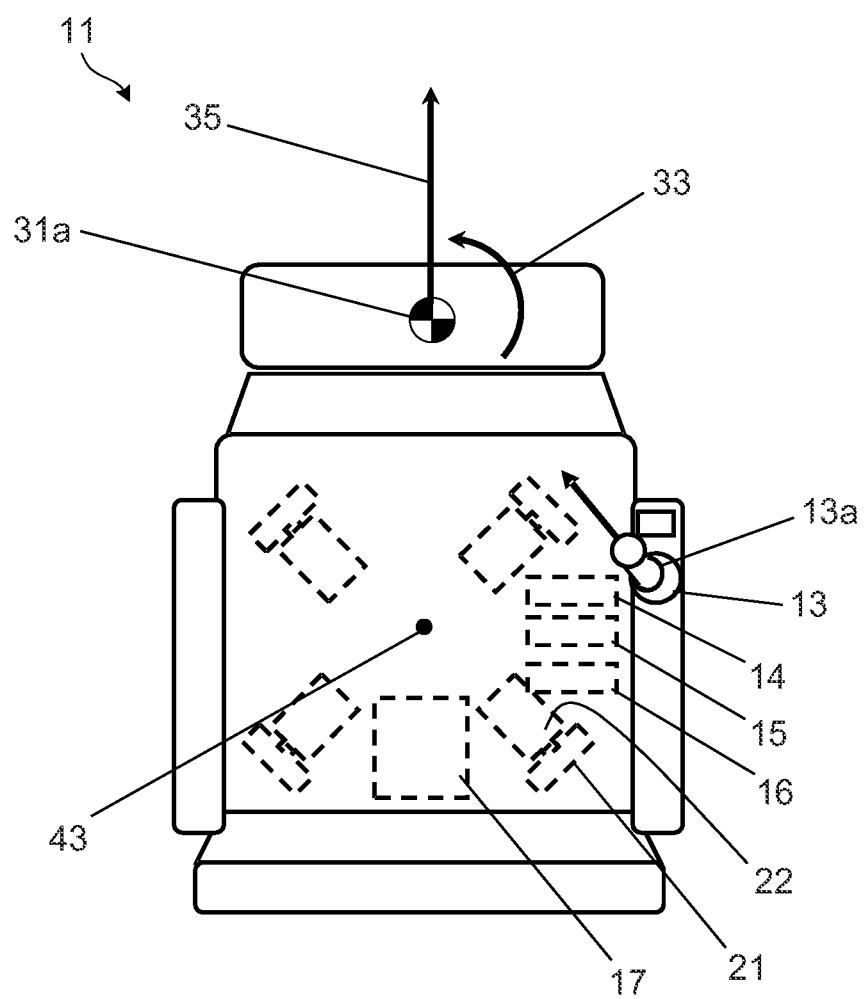
FIG. 7 is a plan view of the electric wheelchair when a rotation center of the electric wheelchair is moved to a first position.
Figure 8:
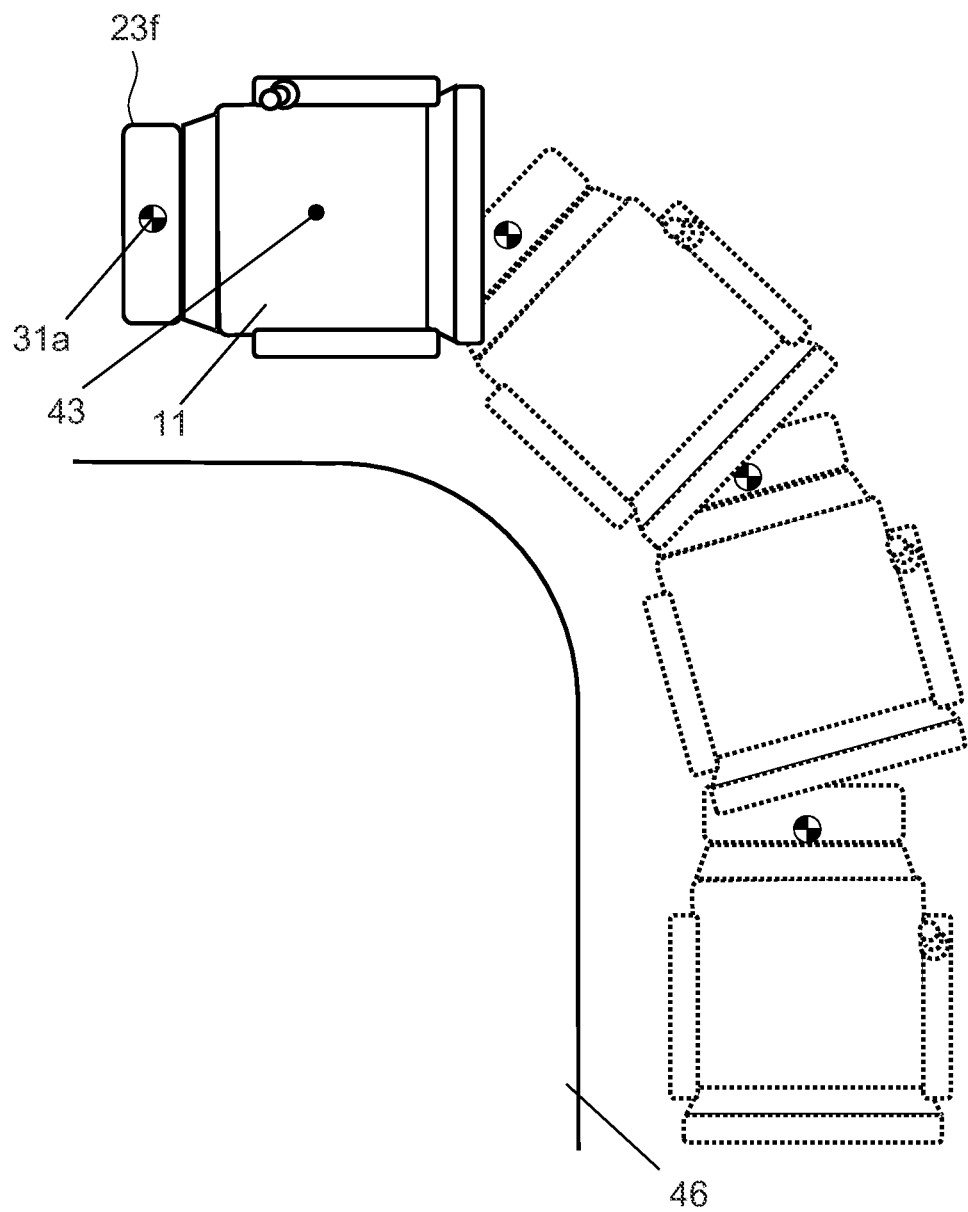
FIG. 8 shows movement of the electric wheelchair when turning a corner about the rotation center at the first position.

FIG. 7 is a plan view of the electric wheelchair when the rotation center of the electric wheelchair is moved to a first position. FIG. 8 illustrates the moving state of the wheelchair for turning a corner of an obstacle with the rotation center moved to the first position.

In the case where the operation mode is the second mode, when the direction of the target straight-movement speed 35 is forward and the magnitude of the target straight-movement speed 35 is at a first threshold (greater than or equal to 50% of the maximum speed as an example) for example, the control unit 15 of the electric wheelchair 11 sets the rotation center 31 at a first position which is 40 cm forward of the reference position 43 of the rotation center (the center of the first bottom 23a), as the first rotation center 31a. Greater than or equal to 50% of the maximum speed which is the first threshold is, for example, greater than or equal to 2 km/h when the maximum speed of the target straight-movement speed 35 is assumed to be 4 km/h. It is to be noted that the reference position 43 is a point defined arbitrary and fixedly at a position that corresponds to the body 12 of the electric wheelchair 11. The reference position 43 may be the origin of the vehicle coordinate system Σr. Here, the rotation center of the reference position 43 is the center of the first bottom 23a.

Specifically, as shown in FIG. 7, when the joystick 13a is inclined to diagonally left, the right/left axial component of the operation amount in the operation direction is in the left, and the forward/backward axial component of the operation amount in the operation direction is in the front. The first processing unit 14 converts the right/left axial component of the operation amount, and generates the target rotation speed 33 for rotating to the left. Furthermore, the first processing unit 14 converts the forward/backward axial component of the operation amount, and generates the target straight-movement speed 35 for translating forward. Furthermore, when the magnitude of the target straight-movement speed 35 is greater than or equal to the first threshold, the control unit 15 sets the first rotation center 31a at the first position which is 40 cm forward of the reference position of the rotation center, and the electric wheelchair 11 rotates about the first rotation center 31a. It is to be noted that the first position, at which the first rotation center 31a is set, may be set at a position having a different distance from the reference position 43 according to the magnitude of the operation amount.

As described above, when the target straight-movement speed 35 is great, setting the rotation center of the electric wheelchair 11 forward in the moving direction of the electric wheelchair 11 allows the user to turn a corner while moving the electric wheelchair 11 at high speed. This is realized because, by setting the rotation center of the electric wheelchair 11 forward in the moving direction of the electric wheelchair 11, the right-left sway width of the front side of the electric wheelchair 11 is reduced when turning a corner such as a corner portion of a moving route (when turning the electric wheelchair 11 while moving forward), which makes it easier to move the rear wheels of the electric wheelchair 11 in a direction farther from the corner portion of the corner. Since the right-left sway width of the front side of the electric wheelchair 11 is reduced when turning the corner, it becomes easier for the user to predict a movement trajectory of the electric wheelchair 11. As a result, by setting the rotation center of the electric wheelchair 11 forward in the moving direction of the electric wheelchair 11, the user can operate the electric wheelchair 11 easily.

As shown in FIG. 8, when the user has to turn the electric wheelchair 11 not to hit the wall 46 of a gentle corner portion or the like of the moving route, setting the first rotation center 31a forward of the electric wheelchair 11 allows the user to look at the peripheral of the fourth bottom 23f and operate the electric wheelchair 11 not to hit the wall 49 with the fourth bottom 23f. As a result, operation of the electric wheelchair 11 to turn a corner (corner portion, for example) becomes easier.

Figure 9:
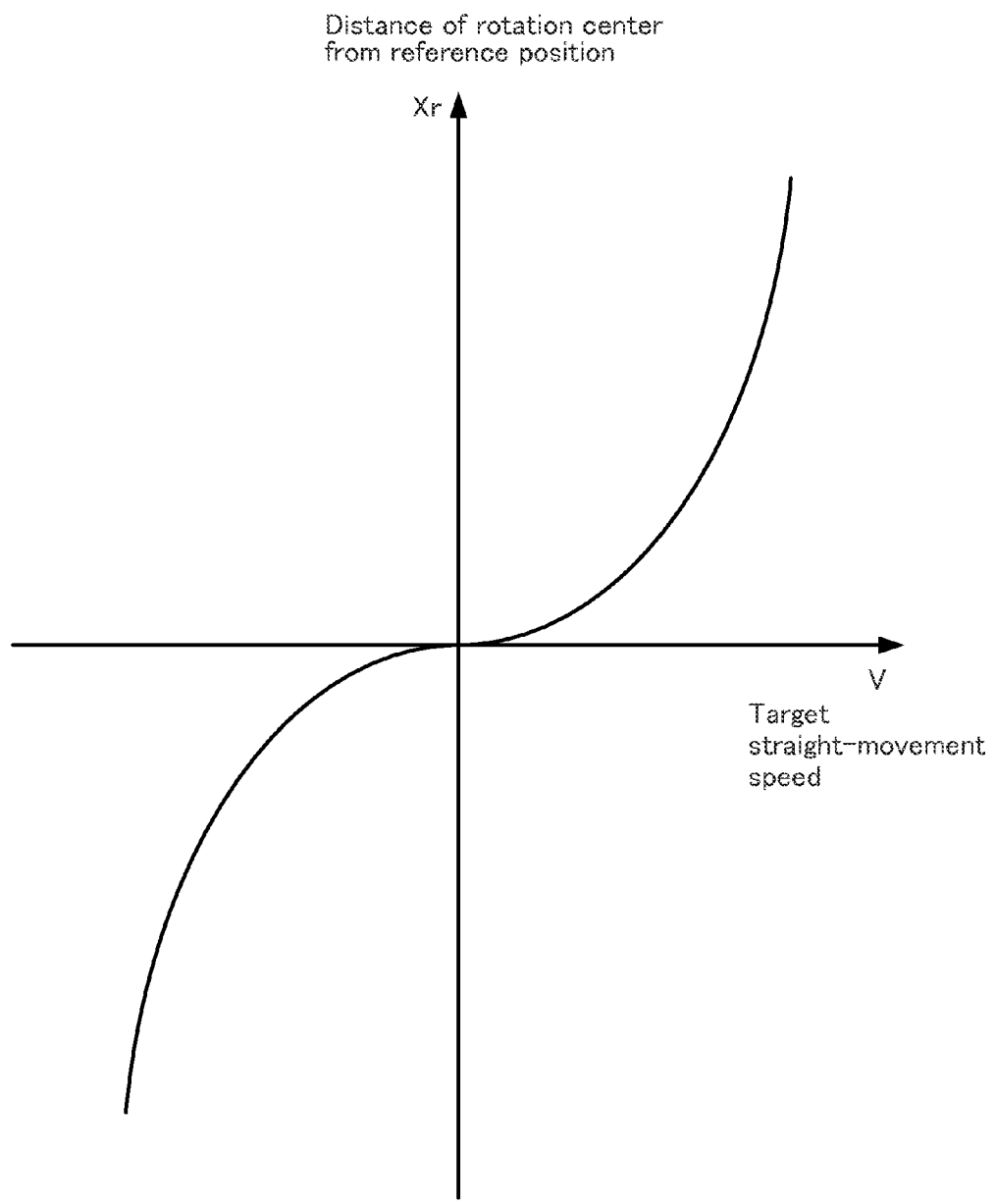
FIG. 9 is a graph showing a target straight-movement speed and a distance of the rotation center from the reference position that corresponds to the target straight-movement speed.

It is to be noted that when the operation mode is the second mode, it is desirable that the control unit 15 of the electric wheelchair 11 sets the first rotation center 31a to a position farther from the reference position 43 along the $x_r$ axis, according to the magnitude of the target straight-movement speed (for example, V in FIG. 9). By setting in the above manner, when the electric wheelchair 11 is moving forward, the first rotation center 31a is set further forward as the target straight-movement speed is greater. Such a setting is particularly effective in the case where, as shown in FIG. 9, the distance ($x_r$ axis) from the reference position 43 has a small change amount with respect to a change amount of the target straight-movement speed when the target straight-movement speed is small, and control is performed in a manner that the distance from the reference position 43 increases in an N-dimensional function manner (N is a natural number) or an exponential function manner as the target straight-movement speed increases.

Figure 11:
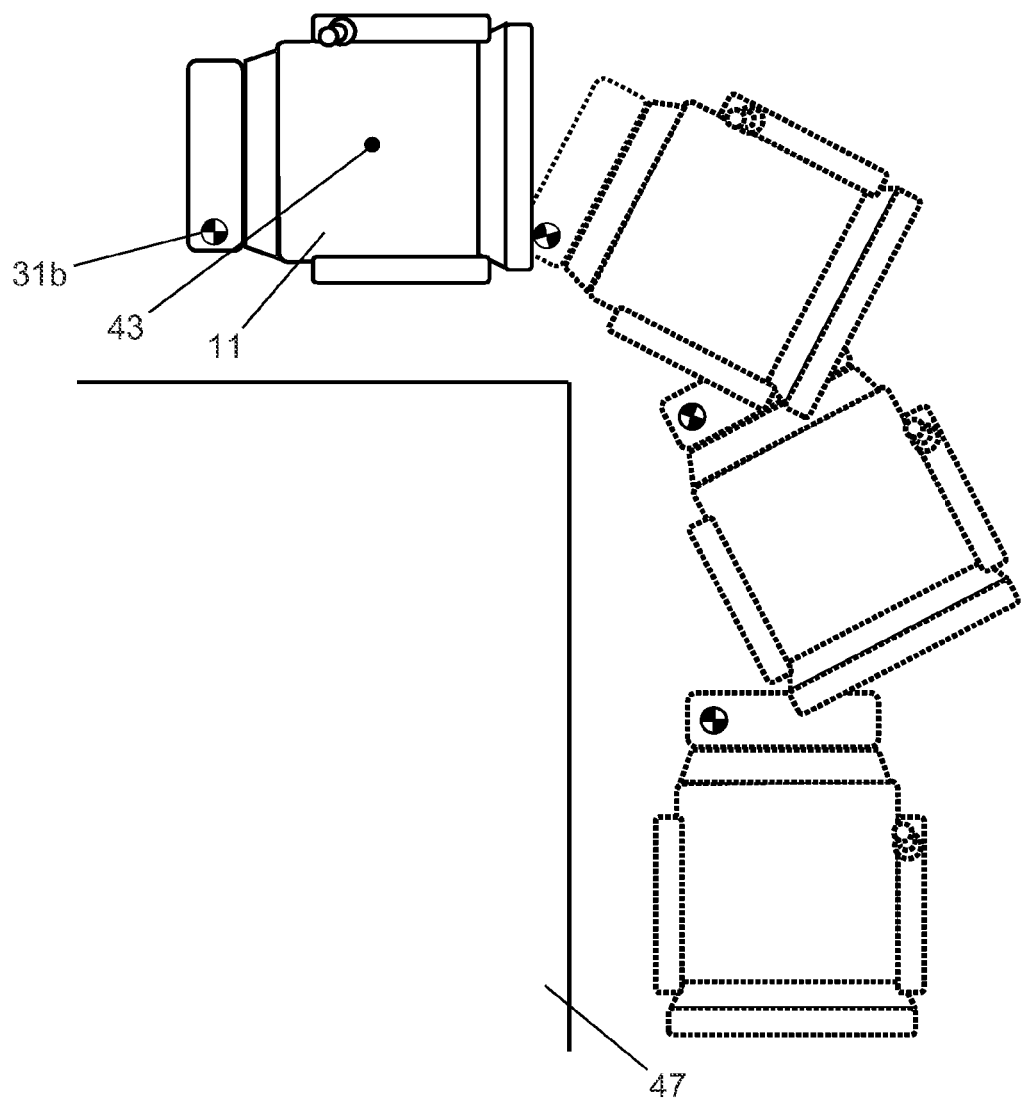
FIG. 11 shows movement of the electric wheelchair when turning a corner about the rotation center at the second position.

Furthermore, as shown in FIG. 11, there are cases where the user turns the electric wheelchair 11 sharply to avoid hitting a wall 47 of a corner such as a sharp corner portion of the moving route. In this case, the control unit 15 of the electric wheelchair 11 may not only move the rotation center of the electric wheelchair 11 from the reference position 43 in a forward direction, but also set a second position (second rotation center 31b) by further moving the rotation center from the reference position 43 to a turning side (corner side) in the right/left direction. Setting in the above manner allows the user to operate the electric wheelchair 11 more easily when sharply turning a sharp corner portion and the like of the wall 47.

For example, when the magnitude of the target rotation speed which is converted from the right/left axial component of the operation amount in the operation direction becomes greater than or equal to a second threshold in order to turn the electric wheelchair 11 sharply with the operation mode being the second mode, the control unit 15 of the electric wheelchair 11 sets the rotation center to 20 cm left of the center in the right and left of the electric wheelchair 11. Furthermore, the control unit 15 of the electric wheelchair 11 sets the rotation center to 20 cm right of the center in the right and left of the electric wheelchair 11, when the magnitude of the target rotation speed which is converted from the right/left axial component of the operation amount in the operation direction becomes greater than or equal to the second threshold. It is to be noted that the positions in the right and left may be set at a position having a different distance from the reference position 43 according to the magnitude of the operation amount detected by the first detection unit 13.

Figure 10:
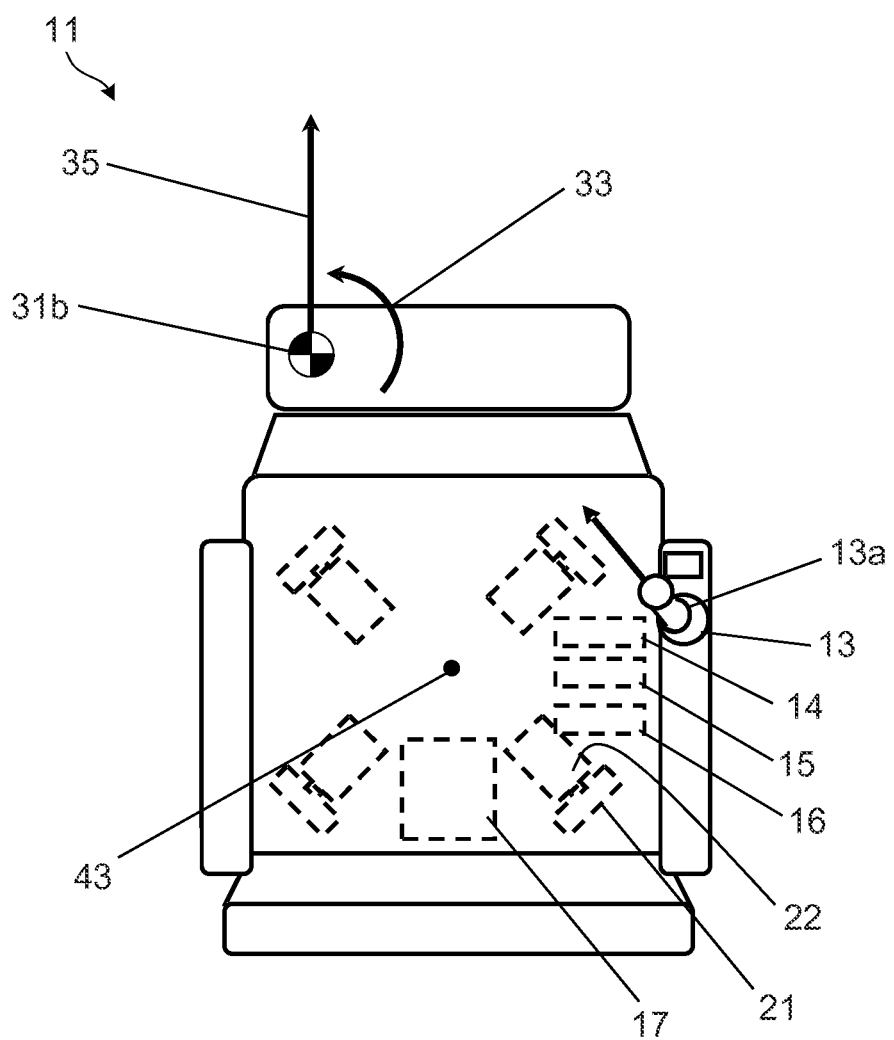
FIG. 10 is a plan view of the electric wheelchair when the rotation center of the electric wheelchair is moved to a second position.

When the joystick 13a is inclined to diagonally left with the operation mode being the second mode as shown in FIG. 10, the right/left axial component of the operation amount in the operation direction is in the left, and the forward/backward axial component of the operation amount in the operation direction is in the front. The first processing unit 14 converts the right/left axial component of the operation amount, and generates the target rotation speed 33 for rotating to the left. Furthermore, the first processing unit 14 converts the forward/backward axial component of the operation amount, and generates the target straight-movement speed 35 for translating forward. Here, when the magnitude of the target straight-movement speed 35 is greater than or equal to the first threshold and the magnitude of the target rotation speed 33 is greater than or equal to the second threshold, as shown in FIG. 10, the second rotation center 31b is set in diagonally forward left of the reference position 43. Specifically, since the magnitude of the target straight-movement speed 35 is greater than or equal to the first threshold the rotation center is set to 40 cm forward of the reference position 43, and since the magnitude of the target rotation speed 33 is greater than or equal to the second threshold the rotation center is set to 20 cm left of the reference position 43. As a result, the second rotation center 31b is set to diagonally forward left of the reference position 43, and therefore the sway width of the left side of the body 12 when turning sharply to the left is further reduced.

Figure 12:
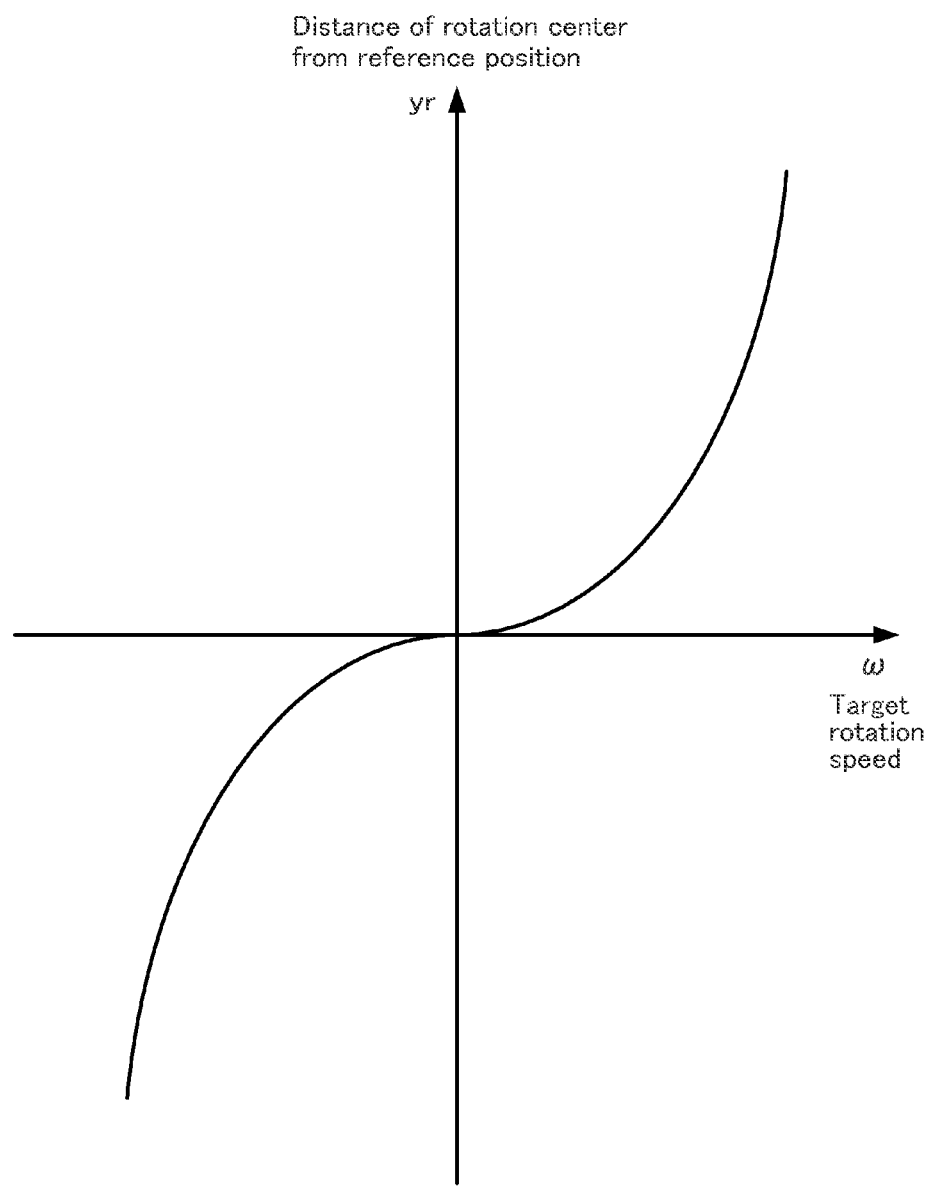
FIG. 12 is a graph showing a target rotation speed and a distance of the rotation center from the reference position that corresponds to the target rotation speed.

It is to be noted that when the operation mode is the second mode, it is desirable that the control unit 15 of the electric wheelchair 11 sets the second rotation center 31b to a position farther from the reference position 43 along the $y_r$ axis, according to the magnitude of the target rotation speed 33 ($\omega$ in FIG. 12). By setting in the above manner, when the electric wheelchair 11 is moving forward, the second rotation center 31b is set farther in the right/left direction as the target rotation speed 33 is greater. This is particularly effective in the case where, as shown in the graph in FIG. 12, the distance ($y_r$ axis) of the rotation center from the reference position has a small change amount with respect to a change amount of the target rotation speed when the target rotation speed is small, and control is performed in a manner that the distance of the rotation center from the reference position increases in the N-dimensional function manner (N is a natural number) or the exponential function manner as the target rotation speed increases.

Figure 13:
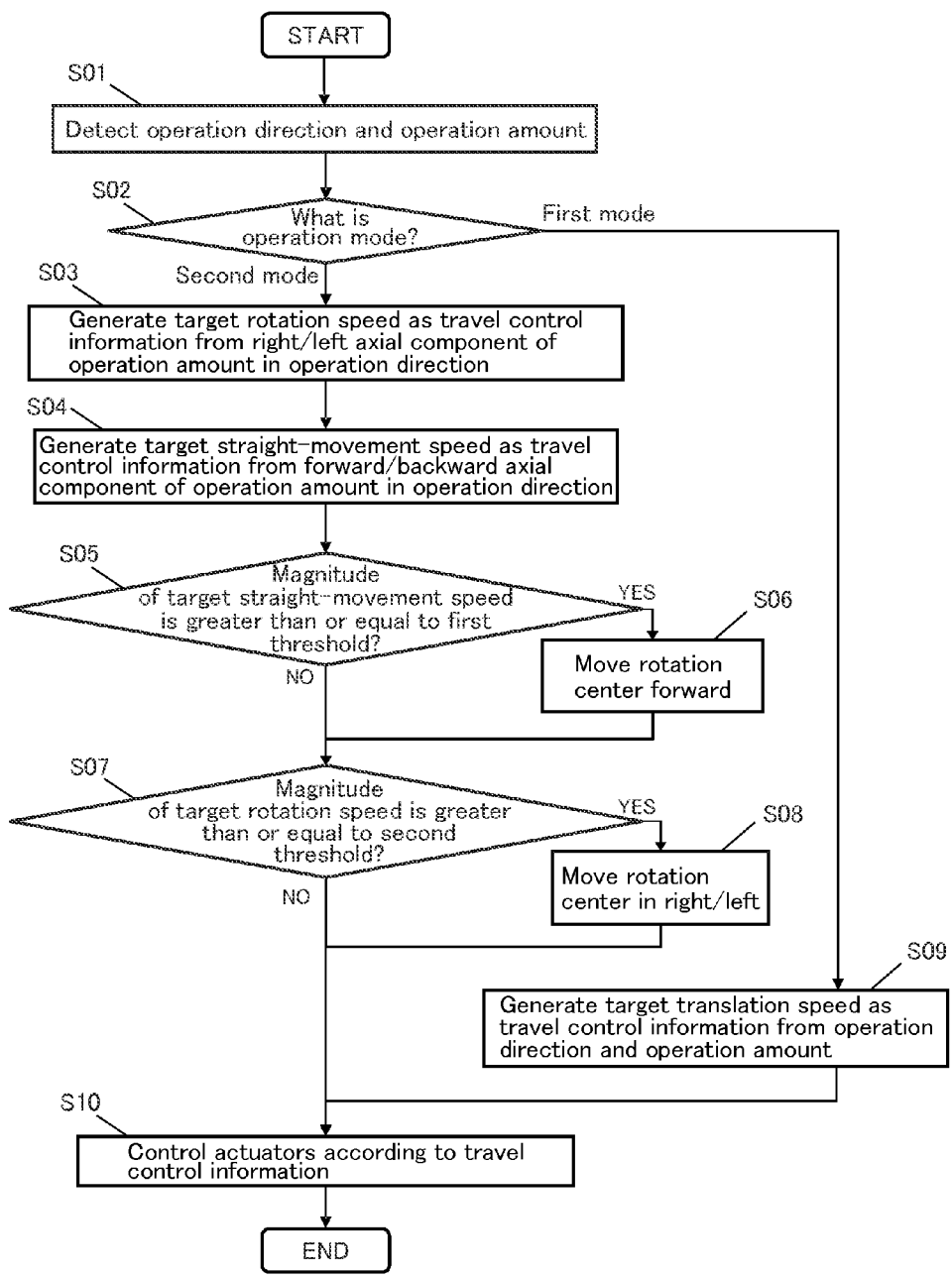
FIG. 13 is a flowchart showing a control process of the electric wheelchair.

Next, the flowchart for control of the electric wheelchair according to Embodiment 1 is described using FIG. 13. It is to be noted that processing of each step described in the flowchart below is performed by the first processing unit 14 or the control unit 15.

First, in S01, the first detection unit 13 detects the operation direction and the operation amount of an operation input by the user of the electric wheelchair 11 based on the inclination of the joystick 13a.

Next, in S02, the current operation mode of the electric wheelchair 11 is determined.

When the result of S02 shows that the operation mode is the second mode ("second mode" in S02), the processing proceeds to S03. When the result of S02 shows that the operation mode is the first mode ("first mode" in S02), the processing proceeds to S09.

In S03, the target rotation speed is generated as the travel control information based on the right/left axial component of the operation amount in the operation direction.

Then, in S04, the target straight-movement speed is generated as the travel control information based on the forward/backward axial component of the operation amount in the operation direction.

It is to be noted that processing order of S03 and S04 may be shuffled, and S03 and S04 may be performed concurrently, when possible.

Next, in S05, determination is made on whether or not the magnitude of the target straight-movement speed generated in S04 is greater than or equal to the first threshold.

When the result of S05 shows that the magnitude of the target straight-movement speed is greater than or equal to the first threshold ("Yes" in S05), the processing proceeds to S07 via S06, and when the result of S05 shows that the magnitude of the target straight-movement speed is smaller than the first threshold ("No" in S05), the processing proceeds to S07 directly. In S06, the rotation center 31 of the electric wheelchair 11 is moved to the first position which is forward of the electric wheelchair 11 along the $x_r$ axis.

Next, in S07, determination is made on whether or not the magnitude of the target rotation speed generated in S03 is greater than or equal to the second threshold.

When the result of S07 shows that the magnitude of the target rotation speed is greater than or equal to the second threshold ("Yes" in S07), the processing proceeds to S10 via S08, and when the result of S07 shows that the magnitude of the target rotation speed is smaller than the second threshold ("No" in S07), the processing proceeds to S10 directly. In S08, the rotation center 31 of the electric wheelchair 11 is moved to the second position in the right and left of the electric wheelchair 11 along the $y_r$ axis.

It is to be noted that processing order of S05 (and S06) and S07 (and S08) may be shuffled, and these steps may be performed concurrently, when possible.

Furthermore, when the result of S02 shows that the operation mode is the first mode ("first mode" in S02), the processing proceeds to S09.

In S09, the target translation speed is generated as the travel control information based on the detected operation direction and the operation amount.

Then, in S10, the electric wheelchair 11 moves through control of the actuators 22 according to the travel control information and driving of the wheels 21.

Here, the translational movement shown in FIG. 1 is made by control via S01, S02, S09, and S10.

Furthermore, the rotation and straight movement shown in FIG. 7 and FIG. 8 are made by control via S01, S02, S03, S04, S05, S06, S07, and S10.

Furthermore, the rotation and straight movement shown in FIG. 10 and FIG. 11 are made by control via S01, S02, S03, S04, S05, S06, S07, S08, and S10.

Embodiment 2

The following describes Embodiment 2 with focusing on differences from Embodiment 1, with reference to the Drawings. Embodiment 2 is conceived to prevent the user from feeling uneasy when the electric wheelchair rotates with the rotation center 31 of the electric wheelchair being significantly far from the user's head.

Figure 14:
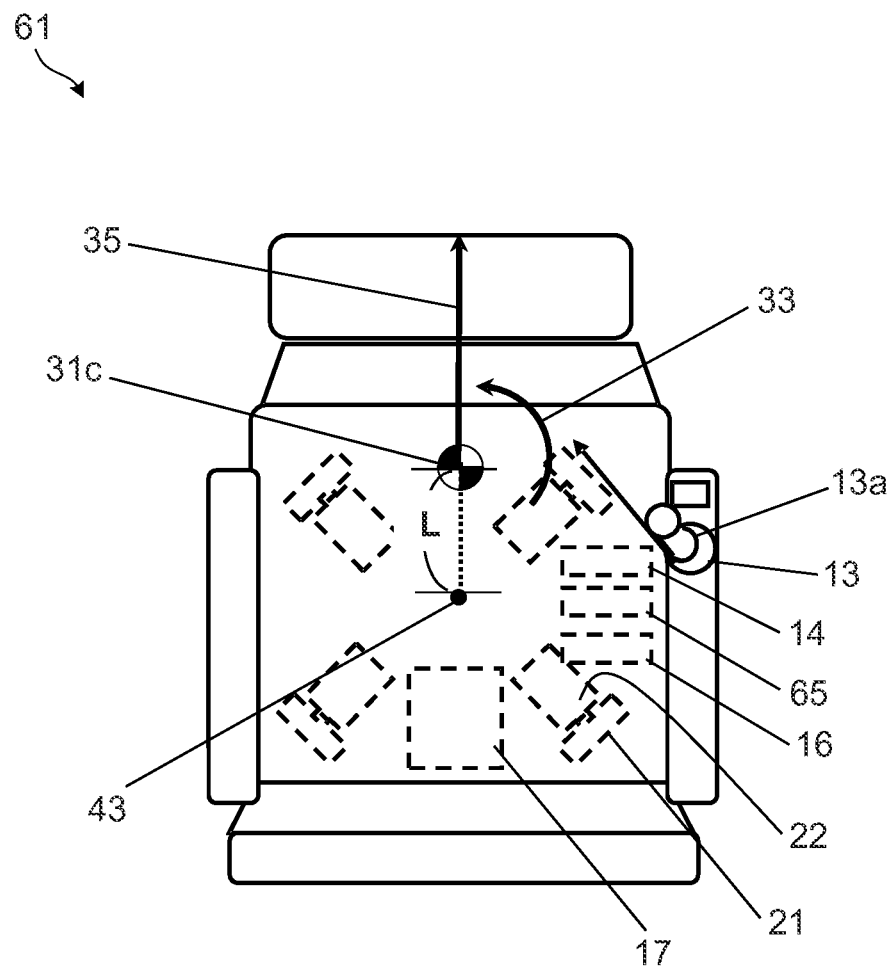
FIG. 14 is a plan view of an electric wheelchair according to Embodiment 2.
Figure 15:
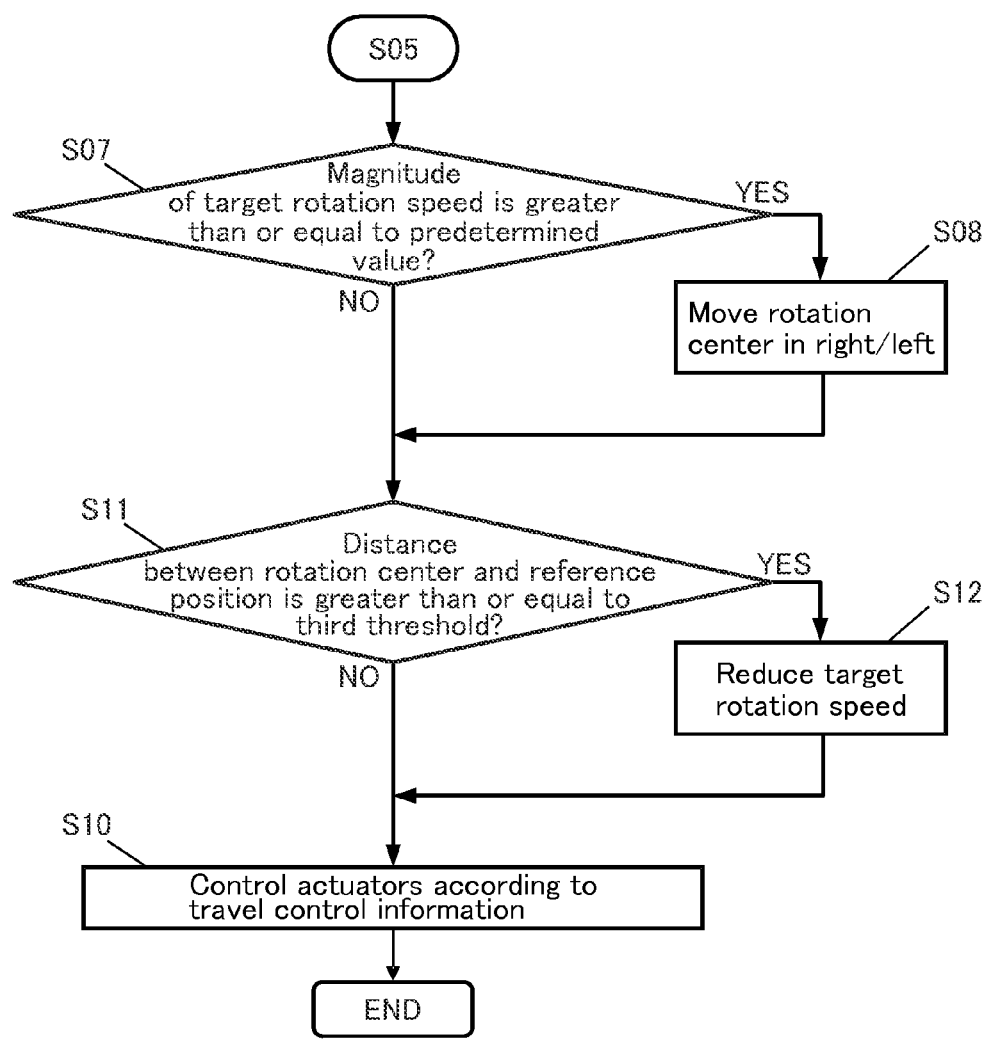
FIG. 15 shows a part of the flowchart showing the additional control process of the electric wheelchair according to Embodiment 2.

FIG. 14 is a plan view of an electric wheelchair according to Embodiment 2. FIG. 15 is a part of the flowchart showing an additional part of control of the electric wheelchair according to Embodiment 2.

A control unit 65 of an electric wheelchair 61 in Embodiment 2: determines whether or not a distance L between a third rotation center 31c and the reference position 43 is greater than or equal to a third threshold when the operation mode is the second mode (S11); and when the result shows that the distance is greater than or equal to the third threshold ("Yes" in S11), proceeds to S12 and reduces the target rotation speed; and then proceeds to S10. On the other hand, when it is determined that the distance L is smaller than the third threshold ("No" in S11), the control unit 65 proceeds to S10 directly.

As described in Embodiment 2, when the distance L is greater than or equal to the third threshold, it is possible to limit the moving speed of the user's head by reducing the target rotation speed. As a result, by controlling the electric wheelchair 61 as in Embodiment 2, it is possible to prevent the user from feeling uneasy while the electric wheelchair 11 is turning.

Embodiment 3

The following describes Embodiment 3 with focusing on differences from Embodiment 1, with reference to the Drawings. Embodiment 3 is conceived to prevent the user from feeling uneasy because of the increase in the inclination of the second bottom 23b that is the back bottom of the chair portion 23, which makes the position of the user's head far from the rotation center 31 of the electric wheelchair and increases the rotation speed of the head through the rotation of the electric wheelchair 61 in this state.

Figure 16:
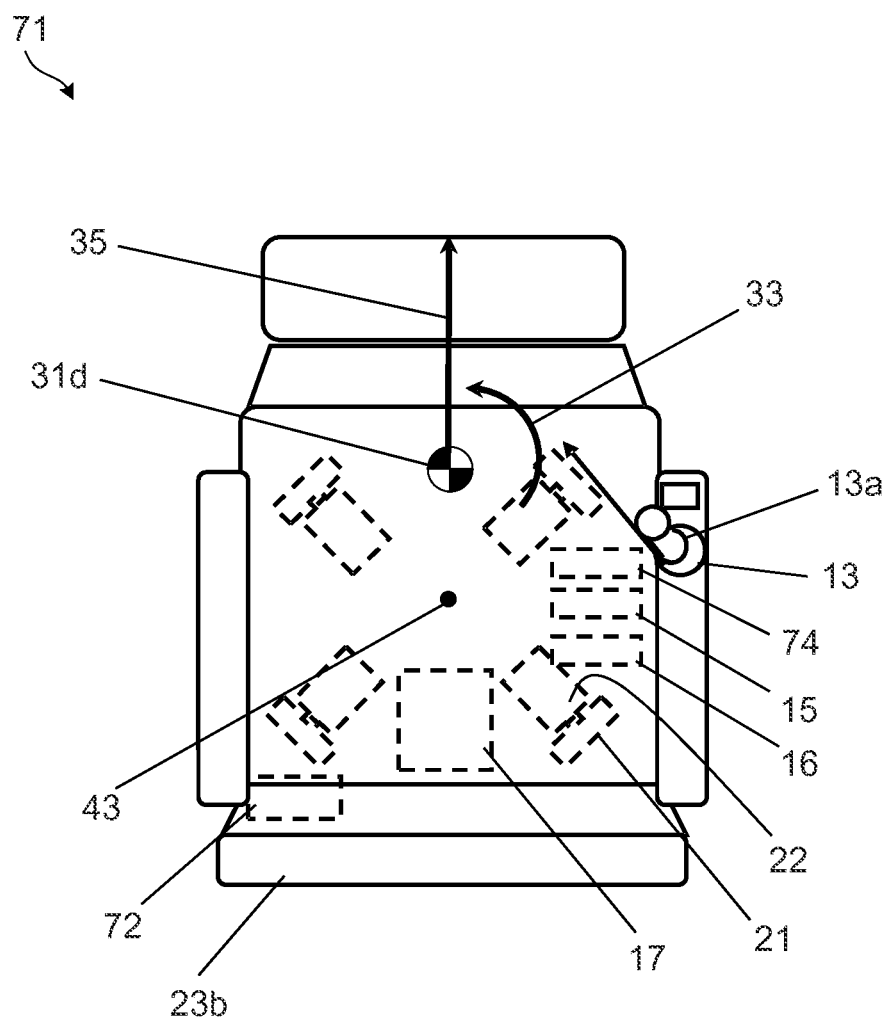
FIG. 16 is a plan view of an electric wheelchair according to Embodiment 3.
Figure 17:
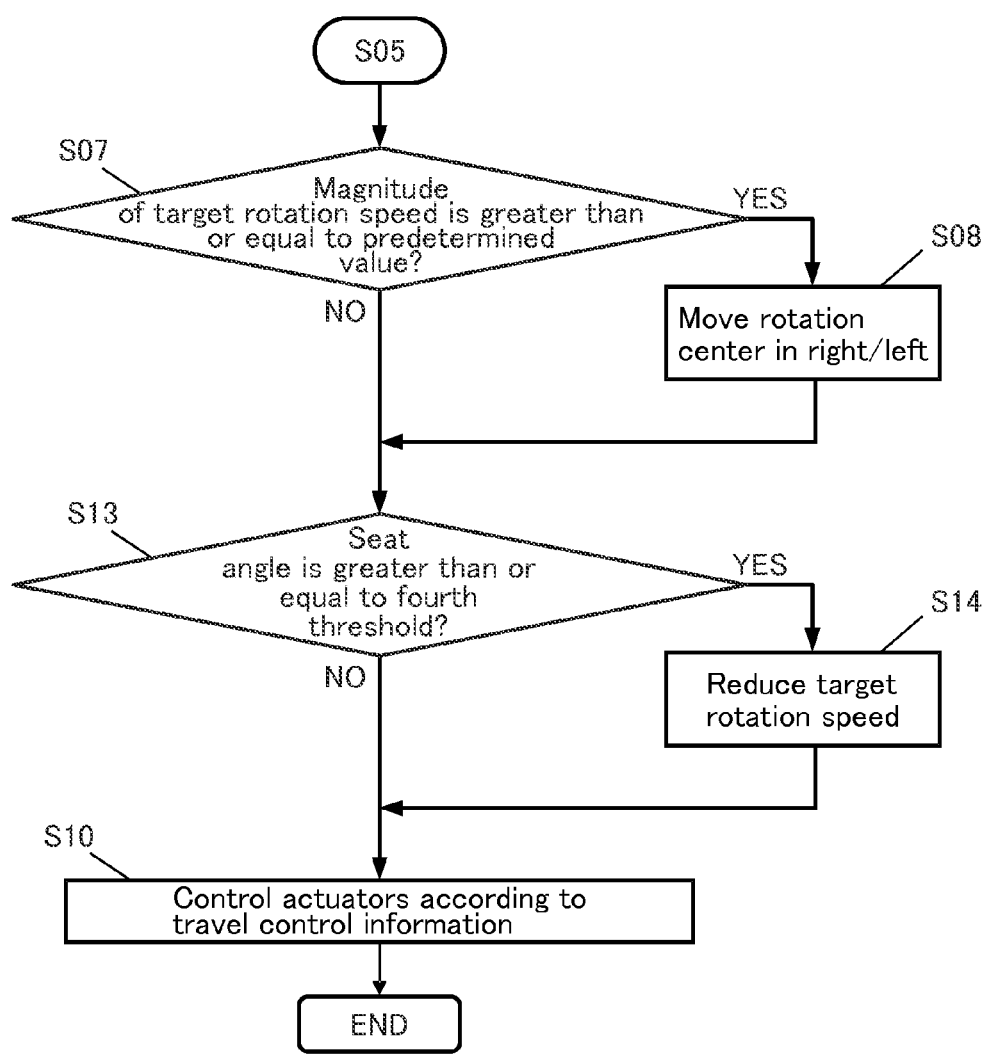
FIG. 17 shows a part of the flowchart showing the additional control process of the electric wheelchair according to Embodiment 3.

FIG. 16 is a plan view of an electric wheelchair according to Embodiment 3. FIG. 17 is a part of the flowchart showing an additional part of control of the electric wheelchair according to Embodiment 3.

The electric wheelchair 71 includes: a chair portion 23 which has a movable second bottom 23b that is a back bottom; and a second detection unit 72 which is an example of a seat angle detection unit which detects the inclination of the second bottom 23b. A second processing unit 74 which is an example of the travel control information generation unit: determines whether or not an inclination angle (seat angle) defined by the second bottom 23b detected by the second detection unit 72 is greater than or equal to a fourth threshold (S13); when it is determined that the seat angle is greater than or equal to the fourth threshold ("Yes" in S13), proceeds to S14 and reduces the target rotation speed; and then proceeds to S10. On the other hand, when it is determined that the seat angle is smaller than the fourth threshold ("No" in S13), the second processing unit 74 proceeds to S10 directly.

As described in Embodiment 3, when the user's head is far from the rotation center because of an inclination of the second bottom 23b at a large angle, it is possible to limit the moving speed of the user's head by reducing the target rotation speed. As a result, by controlling the electric wheelchair 71 as in Embodiment 3, it is possible to prevent the user from feeling uneasy while the electric wheelchair 71 is turning.

The present invention is not limited to the above Embodiments. For example, in another embodiment of the present invention, the constituent elements described in the present Description may be optionally combined or some of the constituent elements may be removed. The present invention also includes variations of the embodiments conceived by those skilled in the art unless they depart from the spirit and scope of the present invention, that is, the wording in the Claims.

Figure 18:
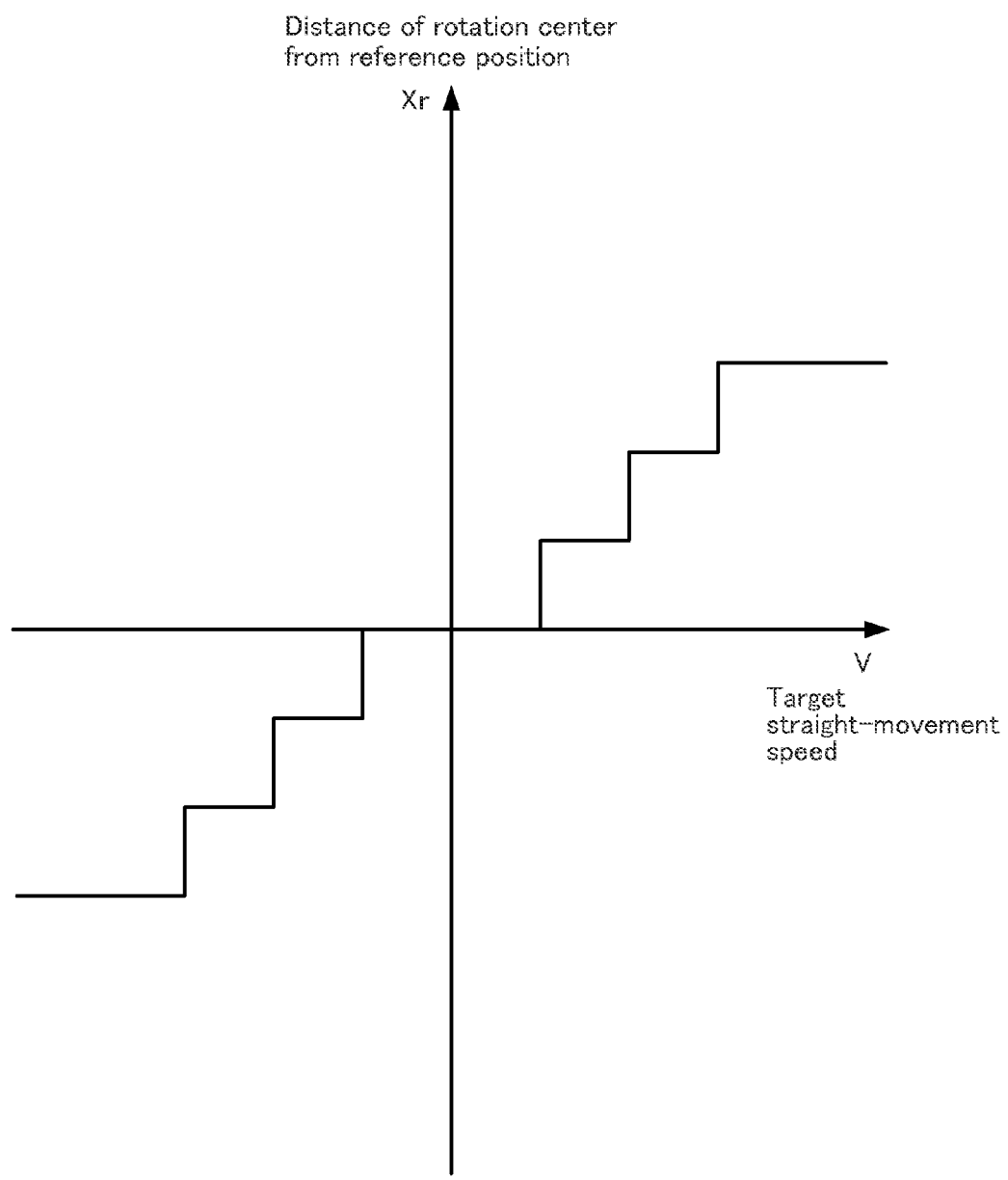
FIG. 18 is a graph showing a target straight-movement speed and a distance of the rotation center from the reference position that corresponds to the target straight-movement.

For example, although only the first threshold is describe as the basis for determining the magnitude of the target straight-movement speed in the above embodiments, as shown in FIG. 18, a plurality of thresholds may be set as the basis for determining the magnitude of the target straight-movement speed and the rotation center may be set farther from the reference position in the forward/backward direction in a phased manner.

Figure 19:
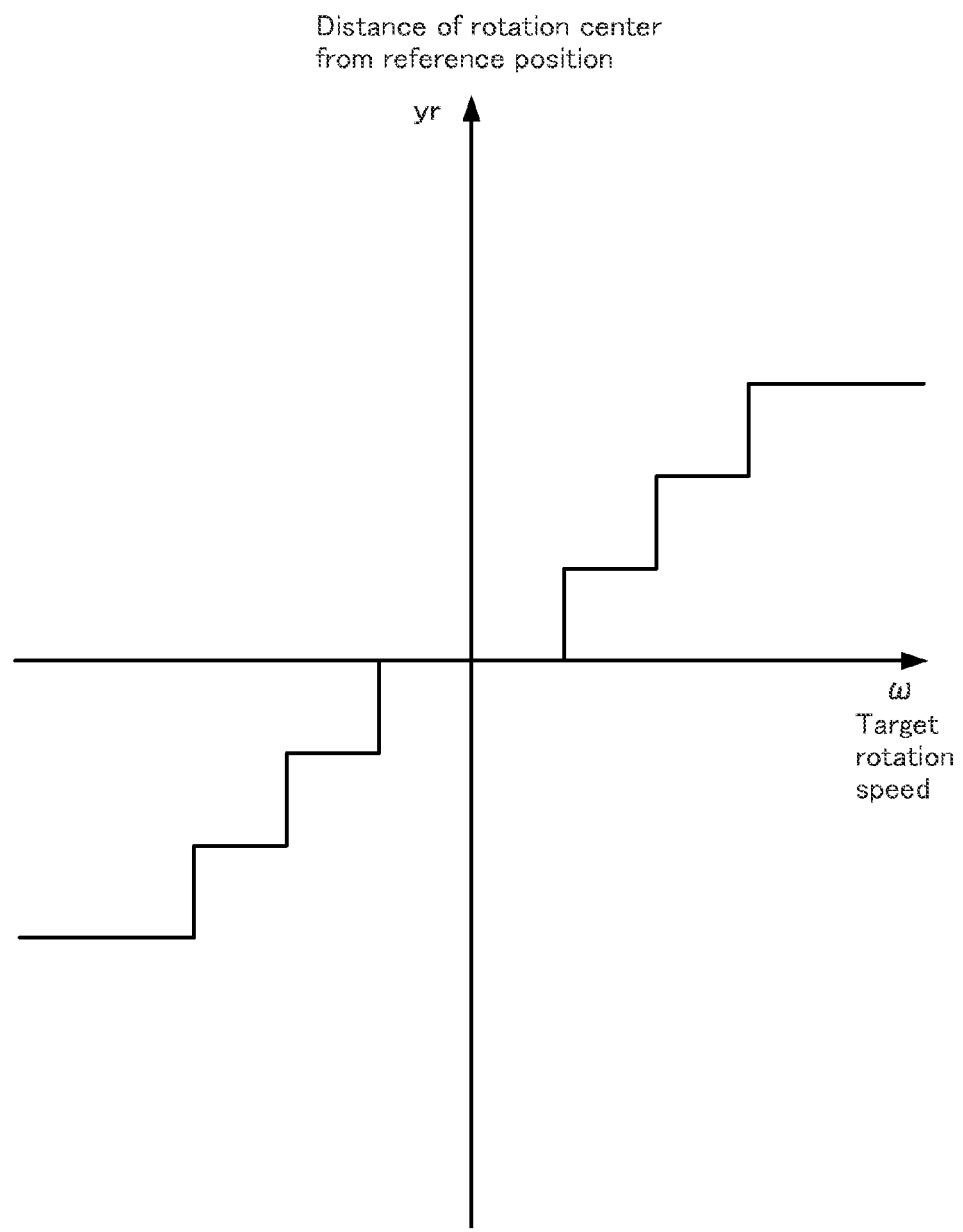
FIG. 19 is a graph showing a target rotation speed and a distance of the rotation center from the reference position that corresponds to the target rotation speed.
Figure 20:
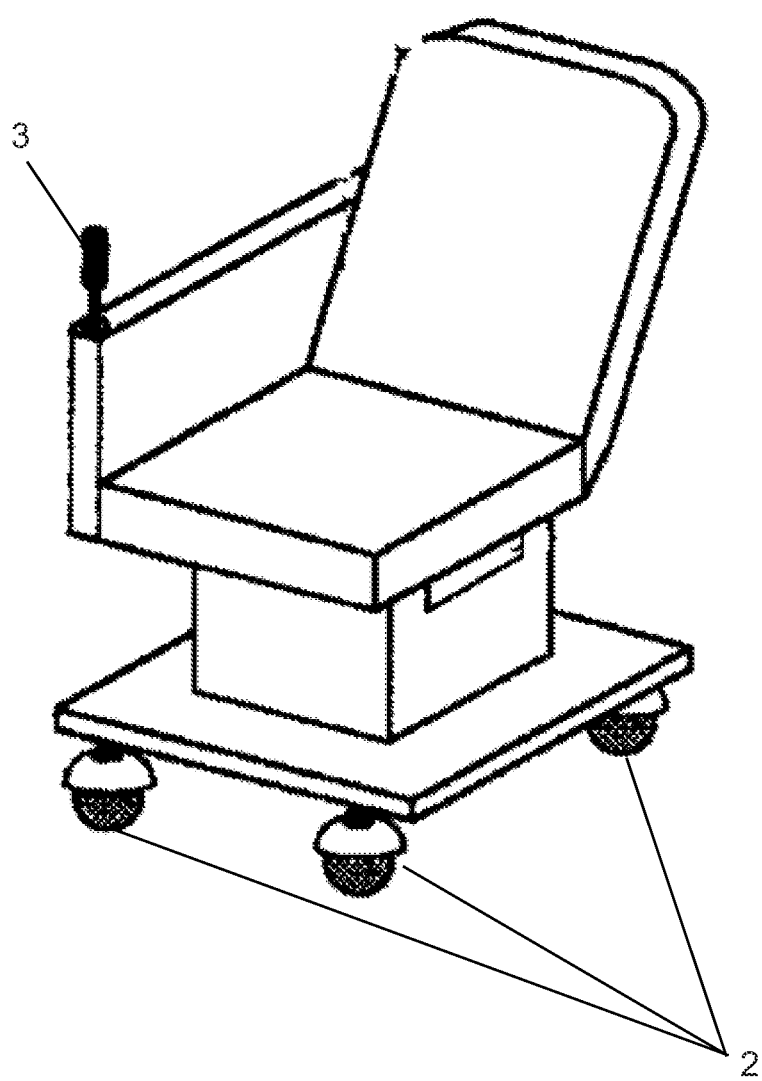
FIG. 20 is a perspective view of a conventional electric wheelchair.

Likewise, although only the second threshold is described as the basis for determining the magnitude of the target rotation speed in the above embodiments, as shown in FIG. 19, a plurality of thresholds may be set as the basis for determining the magnitude of the target rotation speed and the rotation center may be set farther from the reference position in the right/left direction in a phased manner.

The electric vehicle according to the present invention moves with an easy operation, and therefore can be used at hospital facilities, nursing and personal care facilities, and so on.

REFERENCE SIGNS LIST 11, 61, 71 Electric vehicle
12 Body
13 First detection unit
13a Joystick
14 First processing unit
15, 65 Control unit
16 Mode switching unit
17 Battery unit
18 Switch
21 Wheel
22 Actuator
23 Chair portion
23a First bottom
23b Second bottom
23c, 23d Armrest
23e Third bottom
23f Fourth bottom
31 Rotation center
31a First rotation center
31b Second rotation center
31c Third rotation center
31d Fourth rotation center
32 Right/left axial component
33 Target rotation speed
34 Forward/backward axial component
35 Target straight-movement speed
43 Reference position
46, 47 Wall
72 Second detection unit
74 Second processing unit

The invention claimed is:

1. An omni-directional electric vehicle, comprising:
a body having a chair portion on which a user sits;
a first detector configured to detect an operation direction and an operation amount of an operation input by the user; and
at least one hardware processor configured to execute a program so as to operate as:
a first processor configured to generate, based on the operation direction and the operation amount, travel control information including (i) a target straight-movement speed for moving the body in a forward/backward direction set to the body and (ii) a target rotation speed for rotating the body about a rotation center set on the body; and
a controller configured to cause the body to turn a corner or a curve according to the travel control information so as to currently perform straight-movement and rotational movement of the body,
wherein the first processor is configured to dynamically shift, based on the target straight-movement speed, a position of the rotation center in the forward or backward direction from a reference position previously and fixedly set on the body, and
when a magnitude of the target rotation speed is greater than or equal to a threshold, the first processor is configured to dynamically shift the position of the rotation center in a direction closer to an inner side of the corner or the curve.

2. The electric vehicle according to claim 1,
wherein the first processor is configured to determine a distance between the rotation center and the reference position in the forward or backward direction according to a magnitude of the target straight-movement speed.

3. The electric vehicle according to claim 2,
wherein, when the magnitude of the target straight-movement speed is greater than or equal to a first threshold, the first processor is configured to determine the distance between the rotation center and the reference position in the forward or backward direction according to the magnitude of the target straight-movement speed, and to change the position of the rotation center.

4. The electric vehicle according to claim 1,
wherein the first processor is configured to increase the distance between the rotation center and the reference position more when the rotation center is located forward of the reference position than when the rotation center is located backward of the reference position.

5. The electric vehicle according to claim 1,
wherein the first processor is configured to change, based on the target rotation speed, the position of the rotation center from the reference position in a direction which intersects with the forward or backward direction on a horizontal plane.

6. The electric vehicle according to claim 1, wherein the at least one hardware processor is configured to execute the program so as to operate as a mode switch configured to switch an operation mode of the first processor to a mode in which only a target translation speed is generated as the travel control information based on the operation direction and the operation amount.

7. A method for controlling an omni-directional electric vehicle which includes a body having a chair portion on which a user sits, and a first detector which detects an operation direction and an operation amount of an operation input by the user, the method comprising:
generating, based on the operation direction and the operation amount, travel control information including (i) a target straight-movement speed for moving the body in a forward or backward direction set for the body and (ii) a target rotation speed for rotating the body about a rotation center set on the body; and then
when causing the body to turn a corner or a curve according to the travel control information so as to currently perform straight-movement and rotational movement of the body,
shifting dynamically, based on the target straight-movement speed, a position of the rotation center in the forward or backward direction from a reference position previously and fixedly set on the body,
wherein the position of the rotation center is dynamically shifted in a direction closer to an inner side of the corner or the curve when a magnitude of the target rotation speed is greater than or equal to a threshold.

* * * * *